US012803644B2

(12) United States Patent
Girnyk et al.

(10) Patent No.: US 12,803,644 B2
(45) Date of Patent: Nov. 17, 2026

(54) ORIENTATION-ROBUST OPERATION OF PLANAR TRI-POLARIZED ANTENNA ARRAY

(71) Applicant: Telefonaktiebolaget LM Ericsson (publ), Stockholm (SE)

(72) Inventors: Maksym Girnyk, Solna (SE); Jonas Medbo, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 54 days.

(21) Appl. No.: 18/868,248

(22) PCT Filed: Jun. 29, 2022

(86) PCT No.: PCT/EP2022/067912
§ 371 (c)(1),
(2) Date: Nov. 22, 2024

(87) PCT Pub. No.: WO2024/002475
PCT Pub. Date: Jan. 4, 2024

(65) Prior Publication Data

US 2025/0330233 A1 Oct. 23, 2025

(51) Int. Cl.
*H04B 7/10* (2017.01)
*H04B 7/0408* (2017.01)
*H04B 7/06* (2006.01)

(52) U.S. Cl.
CPC ............. *H04B 7/10* (2013.01); *H04B 7/0408* (2013.01); *H04B 7/0617* (2013.01)

(58) Field of Classification Search
CPC ...... H04B 7/10; H04B 7/0408; H04B 7/0617; H04B 7/0871; H01Q 1/2216; H01Q 3/40;
(Continued)

(56) References Cited

U.S. PATENT DOCUMENTS 6,437,737 B1 * 8/2002 Azzarelli ................ H03M 7/30 342/360
2009/0207092 A1 * 8/2009 Nysen .................... H01Q 21/28 343/893

(Continued)

FOREIGN PATENT DOCUMENTS

WO 2022078588 A1 4/2022

OTHER PUBLICATIONS

International Search Report and Written Opinion of the International Searching Authority, PCT/EP2022/067912, mailed Jan. 23, 2023, 13 pages.
Girnyk, Maksym A. et al., "Efficient Cell-Specific Beamforming for Larger Antenna Arrays," IEEE Transactions on Communications, vol. 69, No. 12, Dec. 2021, 14 pages.
Avis, Aki Ayukawa et al., "Three-phase Golay sequence and array triads," Journal of Combinatorial Theory, Series A 180, 2021, 23 pages.

(Continued)

*Primary Examiner* — Syed Haider
(74) *Attorney, Agent, or Firm* — Sage Patent Group

(57) ABSTRACT

A wireless communication device performs wireless transmissions via a planar antenna array of the wireless communication device. The planar antenna array includes multiple antenna elements which are offset from each other in a first spatial direction and a second spatial direction and which each have a first polarization, a second polarization, and a third polarization. For at least some of the wireless transmissions, the wireless communication device performs beamforming processing by: for the first polarization, assigning a first beamforming matrix to the antenna elements; for the second polarization, assigning a second beamforming matrix to the antenna elements; and for the third polarization, assigning a third beamforming matrix to the antenna elements. The first beamforming matrix, the second beamforming matrix, and the third beamforming matrix constitute a Golay array triad.

17 Claims, 8 Drawing Sheets

(58) Field of Classification Search
CPC ........... H01Q 1/28; H01Q 1/30; H04W 88/10; H03M 7/30
USPC ................................. 375/260, 267, 299, 347
See application file for complete search history.

(56) References Cited

U.S. PATENT DOCUMENTS

2016/0268696 A1* 9/2016 Hosseini .............. H01Q 1/2216
2018/0175515 A1* 6/2018 Boutayeb ............... H01Q 21/30
2018/0351264 A1* 12/2018 Liu ...................... H04B 7/0871
2019/0116564 A1* 4/2019 Åström ............... H04W 56/001
2020/0154521 A1* 5/2020 Nguyen ................. H01Q 1/246
2020/0411983 A1* 12/2020 Sano ........................ H01Q 3/40
2021/0266044 A1* 8/2021 Jiang ........................ H04B 7/10
2026/0013006 A1* 1/2026 Nguyen ................ H04W 88/10

OTHER PUBLICATIONS

Li, Ming-Yang et al., “Tri-Polarized 12-Antenna MIMO Array for Future 5G Smartphone Applications,” IEEE Access 6, 2017 (Digital Object Identifier 10.1109/ACCESS.2017.2781705), 11 pages.
Soltanalian, Mojtaba et al., “A fast algorithm for designing complementary sets of sequences,” Signal Processing, vol. 93, No. 7, 2013, 7 pages.
Lawrence, Nicholas P. et al., “5G Terrestrial Networks: Mobility and Coverage—Solution in Three Dimensions,” IEEE Access vol. 5, 2017 (Digital Object Identifier 10.1109/ACCESS.2017.2693375), 30 pages.

* cited by examiner

ORIENTATION-ROBUST OPERATION OF PLANAR TRI-POLARIZED ANTENNA ARRAY

CROSS REFERENCE TO RELATED APPLICATIONS

This application is a 35 U.S.C. § 371 national stage application of PCT International Application No. PCT/EP2022/067912 filed on Jun. 29, 2022, the disclosure and content of which is incorporated by reference herein in its entirety.

TECHNICAL FIELD

The present invention relates to methods for controlling wireless transmissions and to corresponding devices, systems, and computer programs.

BACKGROUND

In wireless communication, it is common to utilize multi-antenna transmission for enhancing performance, e.g., in terms of throughput and/or capacity. For example, in a wireless communication network based on the LTE (Long Term Evolution) or the NR (New Radio) technology specified by 3GPP (3rd Generation Partnership Project), multi-user MIMO (MU-MIMO) communication may be used for serving several users simultaneously with the same time and frequency resource. In this case, an access node of the wireless communication network, in the LTE technology referred to as "eNB" and in the NR technology referred to as "gNB", and/or the user terminals, referred to as UEs (UE: user equipment), are equipped with multiple antennas, in particular antenna arrays. The multiple antennas enable spatial diversity for transmission of data in both an uplink (UL) direction from the UEs to the network and a downlink (DL) direction from the network to the UEs. The spatial diversity significantly increases the capacity of the network. Accordingly, the MU-MIMO technology may allow for a more efficient utilization of the available frequency spectrum. Moreover, the MU-MIMO technology can reduce inter-cell interference which in turn may allow for more frequency re-use. As the electromagnetic spectrum is a scarce resource, the MU-MIMO technology may constitute a valuable contribution when aiming at extension of the capacity of the wireless communication network.

For enhancing performance, multi-antenna systems may be based on dual-polarized antennas. Typically, a dual-polarized antenna in such system consists of two radiating elements, and different polarizations may be provided by orienting the radiating elements in different directions. By leveraging on polarization diversity, it is possible to increase transmission rates by means of spatial multiplexing and beamforming and/or to improve transmission robustness.

However, performance of dual-polarized antenna systems depends on relative positioning and rotations of antennas at the transmitter and receiver side. Orientation robustness is hence an important aspect in such systems, in particular in the case of mobile devices, where the relative positioning and orientation of transmitter and receiver may be subject to significant variation.

In "5G terrestrial networks: Mobility and coverage in three dimensions", by N. P. Lawrence et al., IEEE Access vol. 5 (2017), it was shown that orientation robustness can be significantly improved by employing tri-polarized antennas. Tri-polarized antennas have three ports based on orthogonally oriented radiating elements. A tri-polarized antenna can for example be formed by three orthogonally oriented electric dipoles, three orthogonally oriented magnetic loops, or a combination of electric dipoles and magnetic loops, e.g., two electric dipoles and one magnetic loop. The latter variant may offer the benefit of a fully planar implementation, which is particularly attractive for implementation of antenna arrays.

FIGS. 1A, 1B, 1C, and 1D illustrate how tri-polarized antennas may be used to improve orientation robustness. FIGS. 1A and 1B illustrate polarization diversity that can be achieved by a dual-polarized antenna 11T at the transmitter and a dual-polarized antenna 11R at the receiver. In these examples, a first radiating element of the dual-polarized antenna 11T is assumed to have an orientation described by vector $\hat{n}$, and a second radiating element of the dual-polarized antenna 11T is assumed to have an orientation described by vector $\hat{o}$, which is orthogonal to $\hat{n}$. A first radiating element of the dual-polarized antenna 11R is assumed to have an orientation described by vector $\hat{q}$, and a second radiating element of the dual-polarized antenna 11R is assumed to have an orientation described by vector $\hat{r}$, which is orthogonal to $\hat{q}$. In the example of FIG. 1A, the vectors $\hat{n}$ and $\hat{q}$ are aligned and parallel to each other, and also the vectors $\hat{o}$ and $\hat{r}$ are aligned and parallel to each other, giving a polarization diversity of two. In the example of FIG. 1B, the vectors $\hat{o}$ and $\hat{r}$ are aligned and parallel to each other, but the vectors $\hat{n}$ and $\hat{q}$ co-linear so that the corresponding polarization direction cannot be utilized between the transmitter and the receiver and no polarization diversity is possible. Accordingly, in some scenarios a dual-polarized channel like shown in the example of FIG. 1A may collapse to a single-polarized channel like shown in the example of FIG. 1B.

FIG. 1C shows a situation which is similar to that of FIG. 1B, however assuming that the transmitter is equipped with a tri-polarized antenna 21T having a first radiating element with an orientation described by vector $\hat{m}$, a second radiating element with an orientation described by vector $\hat{n}$, which is orthogonal to $\hat{m}$, and a third radiating element with an orientation described by vector $\hat{o}$, which is orthogonal to $\hat{m}$ and $\hat{n}$. A first radiating element of the dual-polarized antenna 11R is assumed to have an orientation described by vector $\hat{q}$, and a second radiating element of the dual-polarized antenna 11R is assumed to have an orientation described by vector $\hat{r}$, which is orthogonal to $\hat{q}$. In the example of FIG. 1C, the vectors $\hat{n}$ and $\hat{r}$ are aligned and parallel to each other. However, the vectors $\hat{m}$ and $\hat{q}$ co-linear so that the corresponding polarization direction cannot be utilized between the transmitter and the receiver. Further, the vectors $\hat{q}$ and $\hat{r}$ are both orthogonal to the vector $\hat{o}$ describing the orientation and position of the third radiating element of the tri-polarized antenna at the transmitter, so that also the polarization direction corresponding to the third radiating element cannot be utilized between the transmitter and the receiver. Accordingly, also in the scenario of FIG. 1C, only a single-polarized channel can be utilized.

In the example of FIG. 1D, the transmitter is equipped with a tri-polarized antenna 21T having a first radiating element with an orientation described by vector $\hat{m}$, a second radiating element with an orientation described by vector $\hat{n}$, which is orthogonal to $\hat{m}$, and a third radiating element with an orientation described by vector $\hat{o}$, which is orthogonal to $\hat{m}$ and $\hat{n}$. Further, also the receiver is equipped with a tri-polarized antenna 21R having a first radiating element with an orientation described by vector $\hat{p}$, a second radiating element with an orientation described by vector $\hat{q}$, which is orthogonal to $\hat{p}$, and a third radiating element with an orientation described by vector $\hat{r}$, which is orthogonal to $\hat{p}$ and $\hat{q}$. As can be seen from the example of FIG. 1D, at least two polarization directions can be utilized in any relative position of the receiver and transmitter. For the upper right position of the receiver, even three polarization directions could be utilized.

Future communication systems, such as currently developed 6G (6th Generation) systems, are expected to utilize higher frequencies of up to 300 GHZ. In those bands, tiny wavelengths may allow for building huge antenna arrays of reasonable physical size, e.g., with 1000 or more antenna elements, which are small enough to be also used not only on the network side, but also on the UE side. This may for example be beneficial to compensate for excessive pathloss. In scenarios, antenna orientation alignment may be of significant importance for achieving excellent performance. Here, it is noted that even if antenna elements are tri-polarized, beamforming effects result in a radiation pattern which is spatially inhomogeneous. As compared to transmission using a single tri-polarized antenna at the transmitter and a single tri-polarized antenna at the receiver like assumed in the example of FIGS. 1A-1D, the tri-polarized planar antenna arrays are still susceptible to orientation mismatch.

WO 2022/0758588 A1 describes a solution in which orientation robustness is improved for a ULA (Uniform Linear Array) antenna by performing beamforming processing in such a way that that variations of beamforming gain for one polarization are compensated by variations in other polarizations. However, this solution is not adapted for consideration of planar arrays in which antenna elements are arranged in a two-dimensional grid, i.e., offset from each other in a first spatial direction and a second spatial direction.

Accordingly, there is a need for techniques which allow for efficiently achieving orientation robustness for planar antenna arrays formed of tri-polarized antenna elements.

SUMMARY

According to an embodiment, a method of controlling wireless transmissions is provided. According to the method, a wireless communication device performs wireless transmissions via a planar antenna array of the wireless communication device. The planar antenna array comprises multiple antenna elements which are offset from each other in a first spatial direction and a second spatial direction and which each have a first polarization, a second polarization, and a third polarization. For at least some of the wireless transmissions, the wireless communication device performs beamforming processing by: for the first polarization, assigning a first beamforming matrix to the antenna elements; for the second polarization, assigning a second beamforming matrix to the antenna elements; and for the third polarization, assigning a third beamforming matrix to the antenna elements. The first beamforming matrix, the second beamforming matrix, and the third beamforming matrix constitute a Golay array triad.

According to a further embodiment, a method of controlling wireless transmissions is provided. The method comprises configuring a wireless communication device for performing wireless transmissions via a planar antenna array of the wireless communication device. The planar antenna array comprises multiple antenna elements which are offset from each other in a first spatial direction and a second spatial direction and which each have a first polarization, a second polarization, and a third polarization. Further, the method comprises configuring the wireless communication device to, for at least some of the wireless transmissions, perform beamforming processing by: for the first polarization, assigning a first beamforming matrix to the antenna elements; for the second polarization, assigning a second beamforming matrix to the antenna elements; and for the third polarization, assigning a third beamforming matrix to the antenna elements. The first beamforming matrix, the second beamforming matrix, and the third beamforming matrix constitute a Golay array triad.

According to a further embodiment, a wireless communication device is provided. The wireless communication device is adapted to perform wireless transmissions via a planar antenna array of the wireless communication device. The planar antenna array comprises multiple antenna elements which are offset from each other in a first spatial direction and a second spatial direction and which each have a first polarization, a second polarization, and a third polarization. Further, the wireless communication device is adapted to, for at least some of the wireless transmissions, perform beamforming processing by: for the first polarization, assigning a first beamforming matrix to the antenna elements; for the second polarization, assigning a second beamforming matrix to the antenna elements; and for the third polarization, assigning a third beamforming matrix to the antenna elements. The first beamforming matrix, the second beamforming matrix, and the third beamforming matrix constitute a Golay array triad.

According to a further embodiment, a wireless communication device is provided. The wireless communication device comprises at least one processor and a memory. The memory contains instructions executable by said at least one processor, whereby the wireless communication device is operative to perform wireless transmissions via a planar antenna array of the wireless communication device. The planar antenna array comprises multiple antenna elements which are offset from each other in a first spatial direction and a second spatial direction and which each have a first polarization, a second polarization, and a third polarization. Further, the memory contains instructions executable by said at least one processor, whereby the wireless communication device is operative to, for at least some of the wireless transmissions, perform beamforming processing by: for the first polarization, assigning a first beamforming matrix to the antenna elements; for the second polarization, assigning a second beamforming matrix to the antenna elements; and for the third polarization, assigning a third beamforming matrix to the antenna elements. The first beamforming matrix, the second beamforming matrix, and the third beamforming matrix constitute a Golay array triad.

According to a further embodiment, an apparatus for configuring a wireless communication device is provided. The apparatus is adapted to configure a wireless communication device for performing wireless transmissions via a planar antenna array of the wireless communication device. The planar antenna array comprises multiple antenna elements which are offset from each other in a first spatial direction and a second spatial direction and which each have a first polarization, a second polarization, and a third polarization. Further, the apparatus is adapted to configure the wireless communication device to, for at least some of the wireless transmissions, perform beamforming processing by: for the first polarization, assigning a first beamforming matrix to the antenna elements; for the second polarization, assigning a second beamforming matrix to the antenna elements; and for the third polarization, assigning a third beamforming matrix to the antenna elements. The first beamforming matrix, the second beamforming matrix, and the third beamforming matrix constitute a Golay array triad.

According to a further embodiment, an apparatus for configuring a wireless communication device is provided. The apparatus comprises at least one processor and a memory. The memory contains instructions executable by said at least one processor, whereby the apparatus is operative to configure a wireless communication device for performing wireless transmissions via a planar antenna array of the wireless communication device. The planar antenna array comprises multiple antenna elements which are offset from each other in a first spatial direction and a second spatial direction and which each have a first polarization, a second polarization, and a third polarization. Further, the memory contains instructions executable by said at least one processor, whereby the apparatus is operative to configure the wireless communication device to, for at least some of the wireless transmissions, perform beamforming processing by: for the first polarization, assigning a first beamforming matrix to the antenna elements; for the second polarization, assigning a second beamforming matrix to the antenna elements; and for the third polarization, assigning a third beamforming matrix to the antenna elements. The first beamforming matrix, the second beamforming matrix, and the third beamforming matrix constitute a Golay array triad.

According to a further embodiment of the invention, a computer program or computer program product is provided, e.g., in the form of a non-transitory storage medium, which comprises program code to be executed by at least one processor of a wireless communication device. Execution of the program code causes the wireless communication device to perform wireless transmissions via a planar antenna array of the wireless communication device. The planar antenna array comprises multiple antenna elements which are offset from each other in a first spatial direction and a second spatial direction and which each have a first polarization, a second polarization, and a third polarization. Further, execution of the program code causes the wireless communication device to, for at least some of the wireless transmissions, perform beamforming processing by: for the first polarization, assigning a first beamforming matrix to the antenna elements; for the second polarization, assigning a second beamforming matrix to the antenna elements; and for the third polarization, assigning a third beamforming matrix to the antenna elements. The first beamforming matrix, the second beamforming matrix, and the third beamforming matrix constitute a Golay array triad.

According to a further embodiment of the invention, a computer program or computer program product is provided, e.g., in the form of a non-transitory storage medium, which comprises program code to be executed by at least one processor of an apparatus for configuring a wireless communication device. Execution of the program code causes the apparatus to configure a wireless communication device for performing wireless transmissions via a planar antenna array of the wireless communication device. The planar antenna array comprises multiple antenna elements which are offset from each other in a first spatial direction and a second spatial direction and which each have a first polarization, a second polarization, and a third polarization. Further, execution of the program code causes the apparatus to configure the wireless communication device to, for at least some of the wireless transmissions, perform beamforming processing by: for the first polarization, assigning a first beamforming matrix to the antenna elements; for the second polarization, assigning a second beamforming matrix to the antenna elements; and for the third polarization, assigning a third beamforming matrix to the antenna elements. The first beamforming matrix, the second beamforming matrix, and the third beamforming matrix constitute a Golay array triad.

Details of such embodiments and further embodiments will be apparent from the following detailed description of embodiments.

DETAILED DESCRIPTION

Figure 1A:
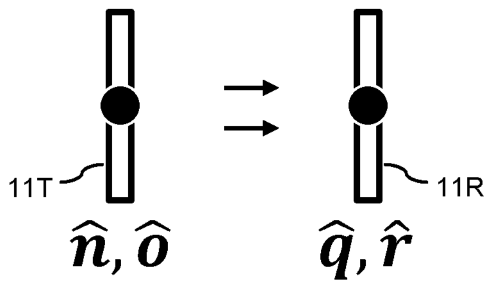
FIGS. 1A, 1B, 1C, 1D schematically illustrate how tri-polarized antennas can be used to improve orientation robustness of wireless transmissions.
Figure 1B:
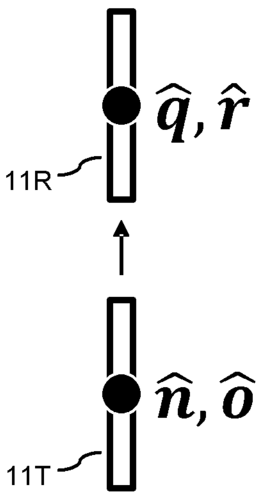
Figure 1C:
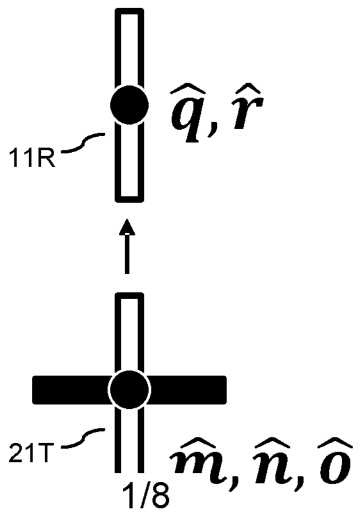
Figure 1D:
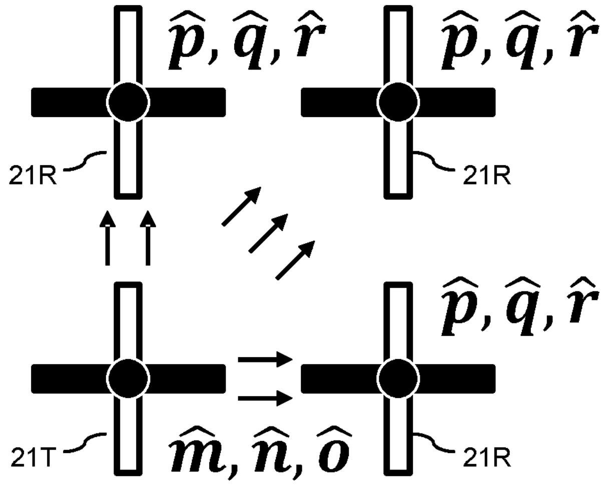

In the following, concepts in accordance with exemplary embodiments of the invention will be explained in more detail and with reference to the accompanying drawings. The illustrated embodiments relate to controlling of multi-antenna transmission in a wireless communication network. The wireless communication network may be based on the LTE radio technology or the NR radio technology. However, it is noted that the illustrated concepts could also be applied to other radio technologies, e.g., a 6G technology or a WLAN (Wireless Local Area Network) technology.

In the illustrated examples, a wireless communication device performs wireless transmissions via a planar antenna array of the wireless communication device. The wireless communication device can be a UE or an access node of the wireless communication system, e.g., an eNB of the LTE technology, a gNB of the NR technology, a corresponding access node of a 6G technology, or a WLAN access point. The wireless transmissions performed by the wireless communication device may involve that the wireless communication device sends wireless transmissions to one or more other wireless communication devices, or that the wireless communication device receives wireless transmissions from one or more other wireless communication devices. The planar antenna array comprises multiple antenna elements which are offset from each other in a first spatial direction and a second spatial direction, i.e., in a two-dimensional pattern. The planar antenna array can for example be a URA (Uniform Rectangular Array). However, other planar array geometries are possible as well. Each antenna element has a first polarization, a second polarization, and a third polarization. These polarizations are different, typically orthogonal. For example, the antenna elements could each be based on electric dipoles, magnetic loops, or a combination of the two, and such components of each antenna element could be arranged in an orthogonal manner. Various known geometries for implementing a tri-polarized antenna element may be utilized. For at least some of the wireless transmissions, the wireless communication device performs beamforming processing by: for the first polarization, assigning a first beamforming matrix to the antenna elements; for the second polarization, assigning a second beamforming matrix to the antenna elements; and for the third polarization, assigning a third beamforming matrix to the antenna elements. The beamforming matrices define a respective beamforming weight for each antenna element and for each polarization of the antenna element. The first beamforming matrix, the second beamforming matrix, and the third beamforming matrix constitute a Golay array triad. As a result, the beamforming weights producing a spectral power densities for each polarization whose sum does not vary with the spatial direction. As a result, reduced sensitivity to orientation misalignment between transmitter and receiver antennas can be achieved, which may in turn contribute to increased link performance. The beamforming matrices may be preconfigured in the wireless communication device or may be determined by the wireless communication device itself, e.g., by applying an algorithm to construct the beamforming matrices as Golay triads. Still further, the beamforming matrices could be configured by some other device. For example, the beamforming matrices to be applied by a UE could be configured by control signaling from a node of the wireless communication network.

Figure 2:
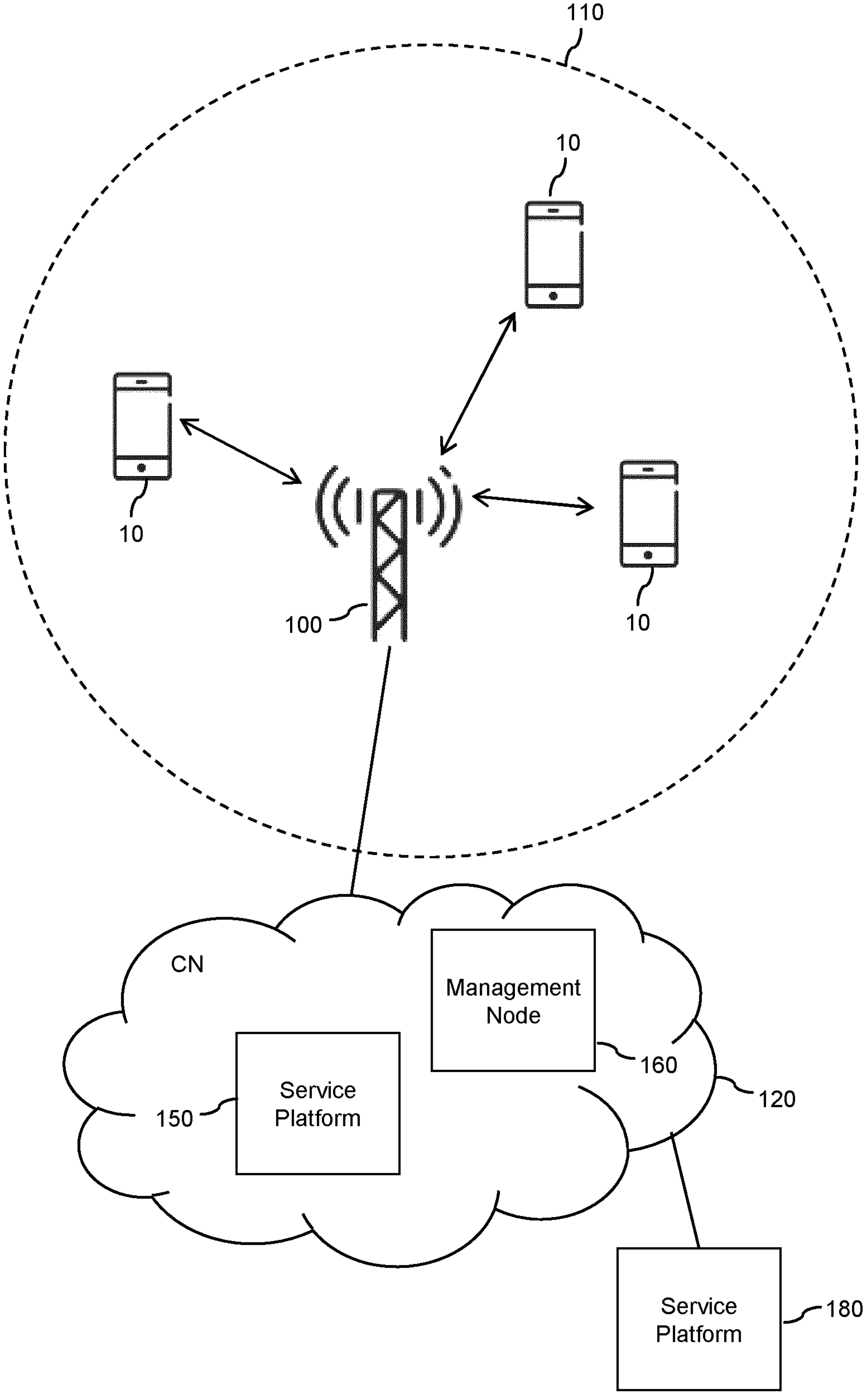
FIG. 2 schematically illustrates a wireless communication scenario according to an embodiment of the invention.

FIG. 2 illustrates exemplary wireless communication network structures. In particular, FIG. 2 shows multiple UEs 10 in a cell 110 of the wireless communication network. The cell 110 is assumed to be served by an access node 100, e.g., an eNB of the LTE technology or a gNB of the NR technology. Further, FIG. 2 illustrates a core network (CN) 120 of the wireless communication network. The CN 120 may for example provide control and management functionalities. In the example of FIG. 2, the CN 120 includes a management node 160, which may for example be used to perform various configuration operations with respect to the UEs 10 and/or the access node 100.

As illustrated by double-headed arrows, the access node 100 may send DL transmissions to the UEs, and the UEs may send UL transmissions to the access node 100. The DL transmissions and UL transmissions may be used to provide various kinds of services to the UEs, e.g., a voice service, a multimedia service, or a data service. Such services may be hosted in the wireless communication network. By way of example, FIG. 2 illustrates a service platform 150 provided in the core network 120. The service platform 150 may for example be based on a server or a cloud computing system. Further, FIG. 2 illustrates a service platform 180 provided outside the wireless communication network. The service platform 180 could for example connect through the Internet or some other wide area communication network to the wireless communication network. Also the service platform 180 may be based on a server or a cloud computing system. The service platform 150 and/or the service platform 180 may provide one or more services to the UEs 10, using data conveyed by DL transmissions and/or UL transmissions between the access node 100 and the respective UE 10.

Figure 3:
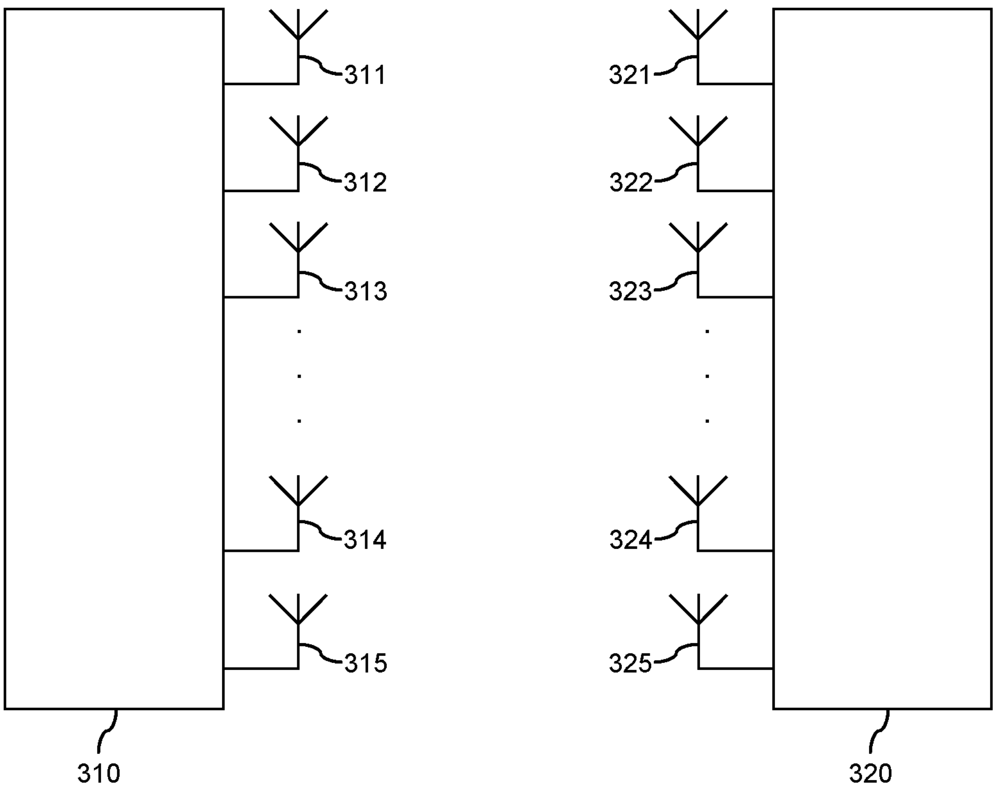
FIG. 3 schematically illustrates transmitter and a receiver according to an embodiment of the invention.

FIG. 3 schematically illustrates multi-antenna transmission between a transmitter device 310 and a receiver device 320. Assuming DL transmissions in a wireless communication network like illustrated in FIG. 2, the transmitter device 310 may correspond to the access node 100, and the receiver device 320 may correspond to one of the UEs 10. As illustrated in FIG. 3, the transmitter device 310 is equipped with a plurality of transmit antenna elements 311, 312, 313, 314, 315. As further illustrated, the receiver device 320 is equipped with a number of receive antenna elements. Specifically, the receiver device 320 is equipped with receive antenna elements 321, 322, 323, 324, 325. It is noted that the illustrated number of the transmit antenna elements and the illustrated number of the receive antenna elements other numbers could be utilized as well. For example, when using a 6G technology, the number of transmit or receive antennas at the access node or UE may be 1024 or higher. The transmit antenna elements each have a tri-polarized configuration, i.e., are capable of transmitting signals with three different polarization directions. These three polarizations may correspond to three mutually orthogonal spatial orientations. The tri-polarized configuration of the antenna elements can for example be based on three orthogonally oriented electric dipoles, three orthogonally oriented magnetic dipoles, or a combination of electric and magnetic dipoles, e.g., two electric dipoles and one magnetic dipole or one electric dipole and two magnetic dipoles.

Figure 4A:
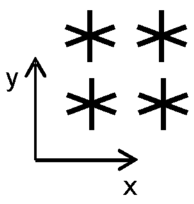
FIGS. 4A, 4B, and 4C schematically illustrate planar antenna arrays which may be utilized in an embodiment of the invention.
Figure 4B:
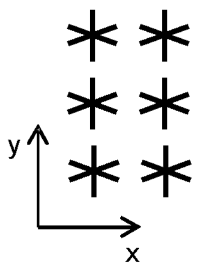
Figure 4C:
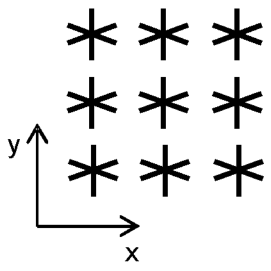

FIGS. 4A, 4B, and 4C schematically illustrate examples of planar antenna arrays that may be formed from the antenna elements 311, 312, 313, 314, 315 or the antenna elements 321, 322, 323, 324, 325. As illustrated, the antenna elements are arranged in a two-dimensional grid, with the antenna elements being offset from each other in two spatial directions, denoted as x and y, so as to cover an area in the antenna plane. In the example of FIG. 4A, the antenna elements form a 2×2 grid. In the example of FIG. 4B, the antenna elements form a 2×3 grid. In the example of FIG. 4A, the antenna elements form a 3×3 grid. It is however noted that these grid sizes are merely exemplary and that in practical scenarios larger grid sizes may be used, e.g., 4×4, 8×8, 16×16 or 32×32. Further, the antenna array may be uniform and rectangular like in the illustrated examples, but could also be non-uniform and/or non-rectangular.

To in order to improve orientation robustness for wireless transmissions using an array of tri-polarized antenna elements, the illustrated concepts utilize beamforming processing of antenna signals. In particular, the beamforming processing is performed in such a way that variations of beamforming gain for one polarization is compensated by variations in other polarizations. In this way, a spatial variation of an overall array factor of the antenna array can be reduced or minimized. Specifically, the beamforming processing is based on defining three beamforming matrices, one for each of the polarizations, which constitute a Golay triad. This usage of the beamforming matrices and their construction is further detailed in the following.

Utilization of a planar antenna array causes beamforming effects, even if there is no specific weighting of the antenna signals of each antenna element, i.e., if the antenna signals are weighted equally. This also applies if all the antenna elements are tri-polarized and destroys rotation invariance of the tri-polarized deployment. The larger the aperture, i.e., the size of the two-dimensional arrangement in the plane of the array, the larger the effect. As mentioned above, in the illustrated concepts a variation of the beamforming pattern in one polarization is compensated by a counter variation in other polarizations. In this way, a directional variation of an array factor of the planar array can be minimized.

When considering a transmitting wireless communication device, e.g., the device 310 of FIG. 3, which uses a URA antenna with N×M tri-polarized antennas antenna elements, the three beamforming matrices for polarizations p=1,2,3 are in the following denoted as $W_p$. The effective radiation pattern of the URA antenna, as observed by a receiving wireless communication device supporting tri-polarized reception based on maximum ratio combining, may then be represented as:

$$G(\hat{r}) = \sum\nolimits_{p=1}^{3} \left| tr\{W_p^T A(\hat{r})\} \right|^2, \tag{1}$$

where A(r̂) is a steering matrix and the observation direction is given by $$\hat{r} = \begin{bmatrix} \sin\theta\ \cos\phi \\ \sin\theta\ \sin\phi \\ \cos\theta \end{bmatrix}, \tag{2}$$

with ϕ being an azimuth observation angle and θ being a zenith observation angle.

For a receiving wireless communication device, e.g., the device 320 of FIG. 3, which uses a URA antenna with N×M tri-polarized antennas antenna elements, the received signal at antenna (m,n) can be represented as:

$$y_{p,n,m} = w_{p,n,m} a_{n,m}(\hat{r}) \sqrt{G_p}\, x + n_{p,n,m}, \tag{3}$$

where x is the transmitted signal, $a_{n,m}$ are the elements of an array response matrix, $n_{p,n,m}$ are the noise terms at the receiver antennas, $G_p$ is the pathloss, and $W_{p,n,m}$ are combining weights for polarization dimension p.

In the illustrated concepts, the matrices $W_p$ constitute a Golay triad. For example, the matrices $W_p$ may be chosen from a set of Golay array triads as described in "Three-phase Golay sequence and array triads.", by Avis et al., Journal of Combinatorial Theory, Series A 180 (2021). As Golay triad, the sum power spectral density of the matrices is complementary, i.e.:

$$\sum\nolimits_{p=1}^{3} |\mathcal{F}\{W_p\}|^2 = 3MN, \tag{4}$$

where $\mathcal{F}\{\cdot\}$ denotes a discrete Fourier transform operation. The sum over all polarizations is thus rotationally invariant, which means that when the matrices $W_p$ are selected to meet relation (1), beamforming processing with the beamforming matrices $W_p$ produces a constant array factor of the planar array.

The matrices $W_p$ may be determined by expanding a triad of vectors ($v_1$, $v_2$, $v_3$), each of length N, for which the sum aperiodic autocorrelation function (AACF) becomes a Dirac delta, i.e.:

$$\sum\nolimits_{p=1}^{3} R_{w_p}(\tau) = 3N\delta(\tau), \tag{5}$$

where $R_{w_p}(\rho)$ is AACF of vector $w_p$ at lag ρ.

Such vectors may also be referred to as Golay triad of vectors. An example of an algorithm for determining such vectors is described in WO 2022/0758588 A1. The expansion from vectors to arrays may for example be performed according to:

$$W_1 = [\,v_1 \quad v_2 \quad v_3\,], \tag{6}$$
$$W_2 = \left[\,v_1 \quad e^{\frac{2\pi j}{3}} v_2 \quad e^{\frac{4\pi j}{3}} v_3\,\right],$$
$$W_3 = \left[\,v_1 \quad e^{\frac{4\pi j}{3}} v_2 \quad e^{\frac{2\pi j}{3}} v_3\,\right].$$

The triad of arrays obtained by the expansion of (6) constitutes Golay triad of size N×3.

According to a further option, the Golay array triad can be constructed from two Golay triads of vectors ($v_1$, $v_2$, $v_3$) and ($u_1$, $u_2$, $u_3$) of length N, which respectively meet criterion (5). Such construction may be accomplished according to:

$$W_1 = [\,v_1 \quad u_1\,], \tag{7}$$
$$W_2 = [\,v_2 \quad u_2\,],$$
$$W_3 = [\,v_3 \quad u_3\,].$$

In this case, a Golay array triad of size N×2 is obtained.

The principle underlying the construction according to (7) can be generalized to higher numbers of Golay triads of vectors. For example, for three Golay triads of vectors ($v_1$, $v_2$, $v_3$), ($u_1$, $u_2$, $u_3$), and ($w_1$, $w_2$, $w_3$) of length N, which respectively meet criterion (5). Such construction may be accomplished according to:

$$W_1 = [\,v_1 \quad u_1 \quad w_1\,], \tag{8}$$
$$W_2 = [\,v_2 \quad u_2 \quad w_2\,],$$
$$W_3 = [\,v_3 \quad u_3 \quad w_3\,].$$

In the latter example, a Golay array triad of size N×3 is obtained.

According to a further option, the Golay array triad can be constructed from another Golay array triad. For example, if ($V_1$, $V_2$, $V_3$) is a Golay array triad of size N×M, then this Golay array triad can be expanded according to:

$$W_1 = [\,V_1 \quad V_2 \quad V_3\,], \tag{9}$$
$$W_2 = \left[\,V_1 \quad e^{\frac{2\pi j}{3}} V_2 \quad e^{\frac{4\pi j}{3}} V_3\,\right],$$
$$W_3 = \left[\,V_1 \quad e^{\frac{4\pi j}{3}} V_2 \quad e^{\frac{2\pi j}{3}} V_3\,\right].$$

In this case, a Golay array triad size N×3M is obtained.

It is noted that the above construction principles can also be applied to reduce Golay array triads in dimension. For example, if ($V_1$, $V_2$, $V_3$) is a Golay array triad of size N×M, it can be reduced to vector dimension according to:

$$w_1 = \psi_{1,2}(V_1), \tag{10}$$
$$w_2 = \psi_{1,2}(V_2),$$

-continued $$w_3 = \psi_{1,2}(V_3),$$

with $\psi_{1,2}(\bullet)$ being a projection mapping, reducing the number of dimensions of the input array by 1 (i.e., matrix to vector conversion). The projection mapping may $\psi_{1,2}(\bullet)$ for example be defined such that, if $B=\psi_{1,2}(A)$, then $$b_{i+sj} = a_{i,j}, \text{ for } 0 \leq i < s. \tag{11}$$

It is noted that Golay vector triads, as obtained by reduction according to (10), could again be expanded to a Golay array triad, e.g., using the principles explained above in connection with relations (6), (7) or (8). The different options of expansion and reduction may thus also be combined. In this way, it becomes possible to address various sizes of planar arrays.

In a more specific example, a Golay array triad for a planar 3×3 array can be constructed by expansion starting from a single tri-polarized antenna element which is excited with equal weight for each polarization, i.e., with weights $$v_1 = 1, \quad v_2 = 1, \quad v_3 = 1. \tag{12}$$

Such scenario may be considered as a primitive case of a Golay triad. The one-dimensional weights can be expanded according to (6) to get three weight vectors, which constitute a Golay vector triad:

$$u_1 = \begin{bmatrix} 1 \\ 1 \\ 1 \end{bmatrix}, u_2 = \exp\left(\frac{2\pi j}{3}\begin{bmatrix} 0 \\ 1 \\ 2 \end{bmatrix}\right), u_3 = \exp\left(\frac{2\pi j}{3}\begin{bmatrix} 0 \\ 2 \\ 1 \end{bmatrix}\right). \tag{13}$$

Then, a further expansion according to (6) can be appended to obtain the beamforming matrices:

$$W_1 = \exp\left(\frac{2\pi j}{3}\begin{bmatrix} 0 & 0 & 0 \\ 0 & 1 & 2 \\ 0 & 2 & 1 \end{bmatrix}\right), \quad W_2 = \exp\left(\frac{2\pi j}{3}\begin{bmatrix} 0 & 1 & 2 \\ 0 & 2 & 1 \\ 0 & 0 & 0 \end{bmatrix}\right), \quad W_3 = \exp\left(\frac{2\pi j}{3}\begin{bmatrix} 0 & 2 & 1 \\ 0 & 0 & 0 \\ 0 & 1 & 2 \end{bmatrix}\right). \tag{14}$$

The beamforming matrices ($W_1$, $W_2$, $W_3$) constitute Golay array triad of size 3×3 in accordance with criterion (4).

Figure 5:
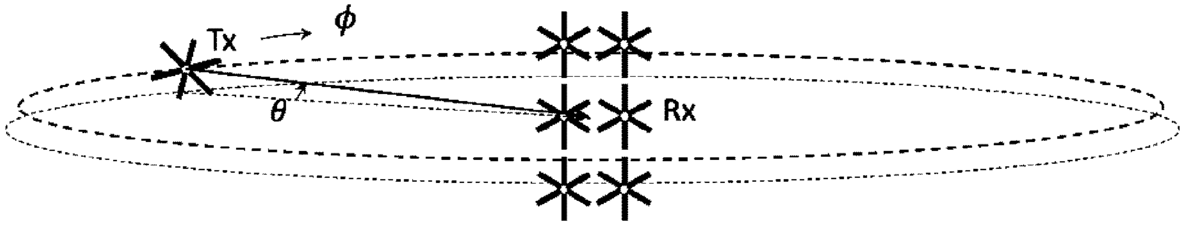
FIG. 5 shows an exemplary scenario in which beamforming processing in accordance with an embodiment of the invention is applied for a planar antenna array with six tri-polarized antenna elements.

In a further example, a scenario like illustrated in FIG. 5 may be considered. In this example, a wireless communication device with a single tri-polarized antenna (denoted by Tx) is transmitting towards a further wireless communication device equipped with a planar array of 3×2 tri-polarized antenna elements (denoted by Rx). The transmitting antenna is placed at an arbitrary location with respect to the receiving antenna array and then moved around the receiving antenna array on a circle at elevation of θ=45°, while spanning all the azimuth angles ¢. The propagation channel is assumed to be full line-of-sight, and so that two modes are available for transmission.

The beamforming matrices to be applied for receiver combining can be obtained by expansion to a Golay array triad according to (7), yielding:

$$W_1 = \exp\left(\frac{2\pi j}{3}\begin{bmatrix} 1 & 1 \\ 1 & 2 \\ 2 & 1 \end{bmatrix}\right), \quad W_2 = \exp\left(\frac{2\pi j}{3}\begin{bmatrix} 0 & 2 \\ 0 & 1 \\ 2 & 2 \end{bmatrix}\right), \quad W_3 = \exp\left(\frac{2\pi j}{3}\begin{bmatrix} 2 & 1 \\ 0 & 1 \\ 0 & 0 \end{bmatrix}\right). \tag{15}$$

Figure 6A:
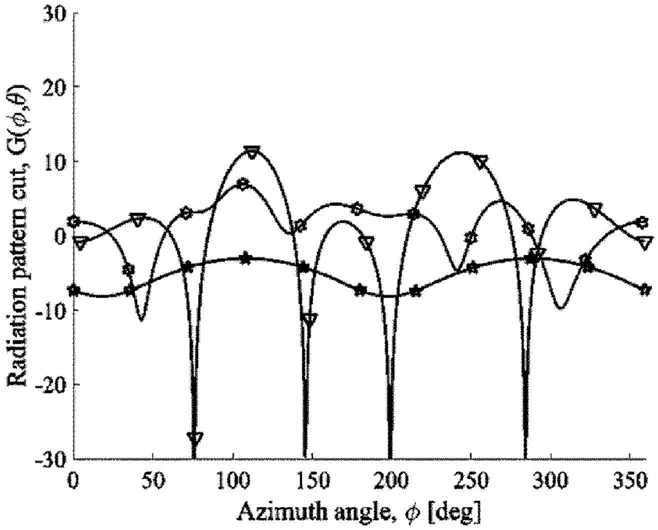
FIGS. 6A and 6B show simulation results for the scenario of FIG. 5.

In FIG. 6A simulation results for the resulting received power profile as a function of the azimuth angle ϕ at the elevation of θ=45° are illustrated by open circle symbols. It can be seen that, even though there is certain ripple due to non-uniformities of the rotated patterns of a single subelement, the variation in the received power of the proposed solution is quite small and in particular significantly smaller than in a comparative simulation where all antenna signals are combined with equal weights (denoted by triangular symbols) and in a further comparative simulation in which only a single antenna element is used for reception (denoted by star symbols).

Figure 6B:
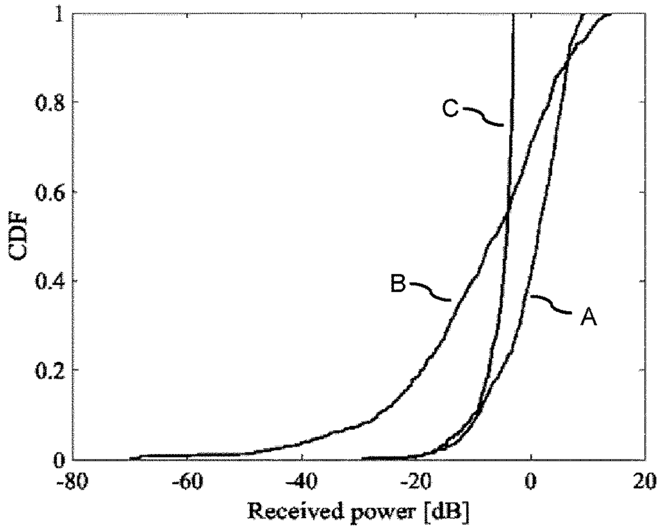

FIG. 6B illustrates further simulations in which all the mutual rotations of the transmitting antenna and the and receiving antenna array were randomized to obtain a cumulative distribution function (CDF) of the received power. In FIG. 6B, the CDF obtained with the beamforming matrices ($W_1$, $W_2$, $W_3$) that constitute the Golay array triad are is denoted by A. A comparative CDF obtained from comparative simulations where all antenna signals were combined with equal weights is denoted by B, and a further comparative CDF obtained from simulations in which only a single antenna element was used for reception is denoted by C. It can be seen that the received power with the beamforming matrices ($w_1$, $w_2$, $w_3$) that constitute the Golay array is higher, across the angles, than in the comparative simulations. In the case of simulation B, there is a narrow angular range with even higher received power, which shows the beamforming effect and associated angular sensitivity which is experienced in this case.

It is noted that the beamforming processing using the beamforming matrices ($W_1$, $W_2$, $W_3$) constituting a Golay array triad may be applied in transmission modes which benefit from a substantially omnidirectional characteristic of the antenna array, e.g., when transmitting in a broadcast mode or when transmitting to a receiver at an unknown or not precisely known position. In other transmission modes, the beamforming processing may be switched to applying beamforming matrices which are calculated to direct maxima of the radiation pattern towards the position of the intended receiver. That is to say, the wireless communication device may also perform beamforming processing using beamforming matrices which are adaptively determined to define one or more directional beams for targeting one or more further wireless communication devices.

Figure 7:
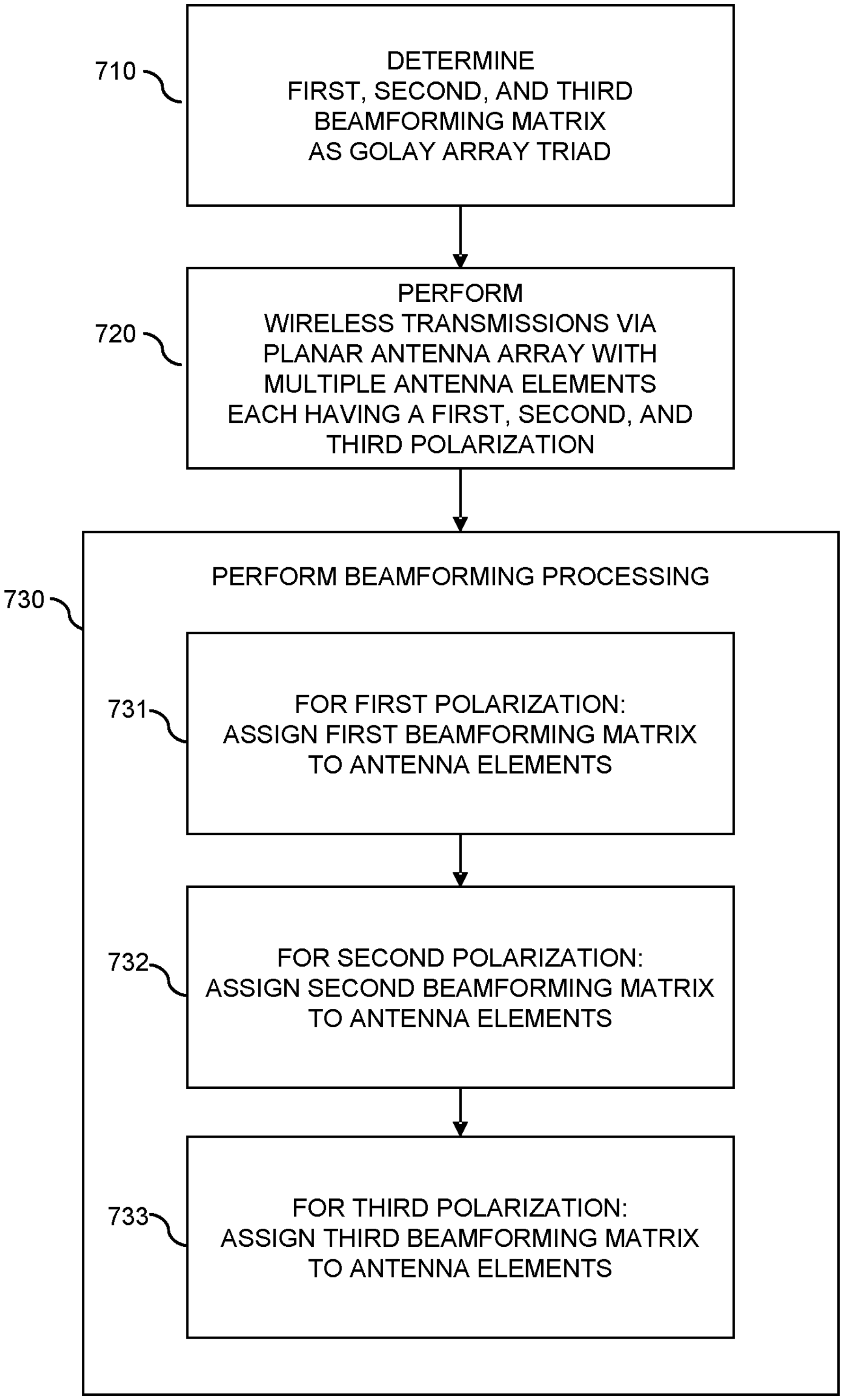
FIG. 7 shows a flowchart for illustrating a method according to an embodiment of the invention.

FIG. 7 shows a flowchart for illustrating a method of controlling wireless transmissions, which may be utilized for implementing the illustrated concepts. The method of FIG. 7 may be used for implementing the illustrated concepts in a wireless communication device, e.g., corresponding to any of the above-mentioned entities 10, 100, 310, or 320. The wireless communication device is assumed to be provided with an antenna array that includes multiple antenna elements with a first polarization, a second polarization, and a third polarization. The first polarization, the second polarization, and the third polarization may be orthogonal linear polarizations. Each antenna element may include at least one electric dipole antenna element and/or at least one magnetic loop antenna element. In some scenarios, each antenna element may include a combination of at least one electric dipole element and at least one magnetic loop element. The antenna array may be implemented as a phased array.

In some scenarios, the wireless communication device may be a mobile communication device, such as one of the above-mentioned UEs. In some scenarios, the wireless communication device may be an access node of a wireless communication network, such as the above-mentioned access node 100.

If a processor-based implementation of the wireless communication device is used, at least some of the steps of the method of FIG. 7 may be performed and/or controlled by one or more processors of the wireless communication device. Such wireless communication device may also include a memory storing program code for implementing at least some of the below described functionalities or steps of the method of FIG. 7.

At step 710, the wireless communication device may determine a first beamforming matrix, a second beamforming matrix, and a third beamforming matrix, which constitute a Golay array triad, i.e., meet criterion (4).

At step 720, the wireless communication device performs wireless transmissions via a planar antenna array of the wireless communication device. The planar antenna array includes multiple antenna elements which are offset from each other in a first spatial direction and a second spatial direction and which each have a first polarization, a second polarization, and a third polarization. The planar antenna array may for example be a URA. Examples of such planar antenna arrays are illustrated in FIGS. 4A, 4B, and 4C.

The first polarization, the second polarization, and the third polarization may be orthogonal linear polarizations. Each antenna element may include at least one electric dipole antenna element, at least one magnetic loop antenna element, or a combination of at least one electric dipole antenna element and at least one magnetic loop antenna element.

At step 730, the wireless communication device performs beamforming processing for at least some of the wireless transmissions. The beamforming processing may be performed on signals to be transmitted from the planar antenna array or on signals received by the planar antenna array.

As illustrated by steps 731, 732, and 733, the beamforming processing involves assigning a first beamforming matrix for the first polarization to the antenna elements, assigning a second beamforming matrix for the second polarization to the antenna elements, and assigning a third beamforming matrix for the third polarization to the antenna elements. The first beamforming matrix, the second beamforming matrix, and the third beamforming matrix constitute a Golay array triad which meets criterion (4). The first, second, and third beamforming matrix may be those which were determined by the wireless communication device at step 710. However, the first, second, and third beamforming matrix could also be preconfigured in the wireless communication device or be determined and configured from outside the wireless communication device, e.g., based on received control or configuration signaling.

In some scenarios, the Golay array triad may be determined by expanding one or more Golay vector triads, e.g., as explained in connection with relations (6), (7), and (8). Alternatively or in addition, the Golay array triad may be determined by expanding one or more further Golay array triads, e.g., as explained in connection with relation (9). In some scenarios, the Golay array triad may be based on expansion starting from a primitive case of a Golay triad, e.g., as explained in connection with (12)-(14).

In some scenarios, the wireless communication device may be provided with multiple modes of operation. In particular, in a first mode of operation, the wireless communication device may perform one or more of the wireless transmissions based on the beamforming processing with the first beamforming matrix, the second beamforming matrix, and the third beamforming matrix. In a second mode of operation, the wireless communication device may perform one or more of the wireless transmissions based on performing the beamforming processing by: for the first polarization, assigning a first targeted beamforming matrix to the antenna elements; for the second polarization, assigning a second targeted beamforming matrix to the antenna elements; and for the third polarization, assigning a third targeted beamforming matrix to the antenna elements. The first targeted beamforming matrix, the second targeted beamforming matrix, and the third targeted beamforming matrix may then be adaptively determined to define one or more beams directed to one or more further wireless communication devices.

Figure 8:
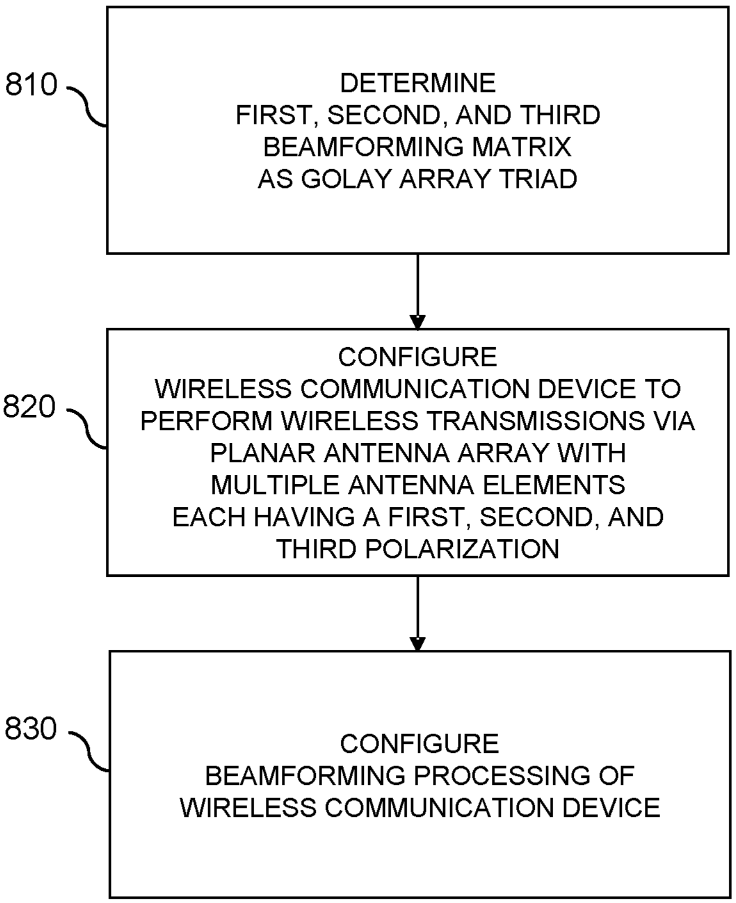
FIG. 8 shows a flowchart for illustrating a further method according to an embodiment of the invention.

FIG. 8 shows a flowchart for illustrating a method of configuring wireless communication device, which may be utilized for implementing the illustrated concepts. The method of FIG. 8 may be used for implementing the illustrated concepts in an apparatus for configuring a wireless communication device, e.g., in manufacturer equipment or in a node of a wireless communication network, e.g., such as in the above-mentioned access node 100 or management node 160. The wireless communication device to be configured is assumed to be provided with an antenna array that includes multiple antenna elements with a first polarization, a second polarization, and a third polarization. The first polarization, the second polarization, and the third polarization may be orthogonal linear polarizations. Each antenna element may include at least one electric dipole antenna element and/or at least one magnetic loop antenna element. In some scenarios, each antenna element may include a combination of at least one electric dipole element and at least one magnetic loop element. The antenna array may be implemented as a phased array.

In some scenarios, the wireless communication device may be a mobile communication device, such as one of the above-mentioned UEs. In some scenarios, the wireless communication device may be an access node of a wireless communication network, such as the above-mentioned access node 100.

If a processor-based implementation of the apparatus is used, at least some of the steps of the method of FIG. 8 may be performed and/or controlled by one or more processors of the apparatus. Such apparatus may also include a memory storing program code for implementing at least some of the below described functionalities or steps of the method of FIG. 8.

At step 810, the apparatus may determine a first beamforming matrix, a second beamforming matrix, and a third beamforming matrix, which constitute a Golay array triad, i.e., meet criterion (4).

At step 820, apparatus configures the wireless communication device to perform wireless transmissions via a planar antenna array of the wireless communication device. The planar antenna array includes multiple antenna elements which are offset from each other in a first spatial direction and a second spatial direction and which each have a first polarization, a second polarization, and a third polarization. The planar antenna array may for example be a URA. Examples of such planar antenna arrays are illustrated in FIGS. 4A, 4B, and 4C.

The first polarization, the second polarization, and the third polarization may be orthogonal linear polarizations. Each antenna element may include at least one electric dipole antenna element, at least one magnetic loop antenna element, or a combination of at least one electric dipole antenna element and at least one magnetic loop antenna element.

At step 830, the apparatus configures beamforming processing for at least some of the wireless transmissions of the wireless communication device. The beamforming processing may be performed on signals to be transmitted from the planar antenna array or on signals received by the planar antenna array.

The beamforming processing involves assigning a first beamforming matrix for the first polarization to the antenna elements, assigning a second beamforming matrix for the second polarization to the antenna elements, and assigning a third beamforming matrix for the third polarization to the antenna elements. The first beamforming matrix, the second beamforming matrix, and the third beamforming matrix constitute a Golay array triad which meets criterion (4). The first, second, and third beamforming matrix may be those which were determined by the apparatus at step 810. However, the first, second, and third beamforming matrix could also be preconfigured in the wireless communication device or be determined and configured from outside the wireless communication device, e.g., based on received control or configuration signaling.

In some scenarios, the Golay array triad may be determined by expanding one or more Golay vector triads, e.g., as explained in connection with relations (6), (7), and (8). Alternatively or in addition, the Golay array triad may be determined by expanding one or more further Golay array triads, e.g., as explained in connection with relation (9). In some scenarios, the Golay array triad may be based on expansion starting from a primitive case of a Golay triad, e.g., as explained in connection with (12)-(14).

Figure 9:
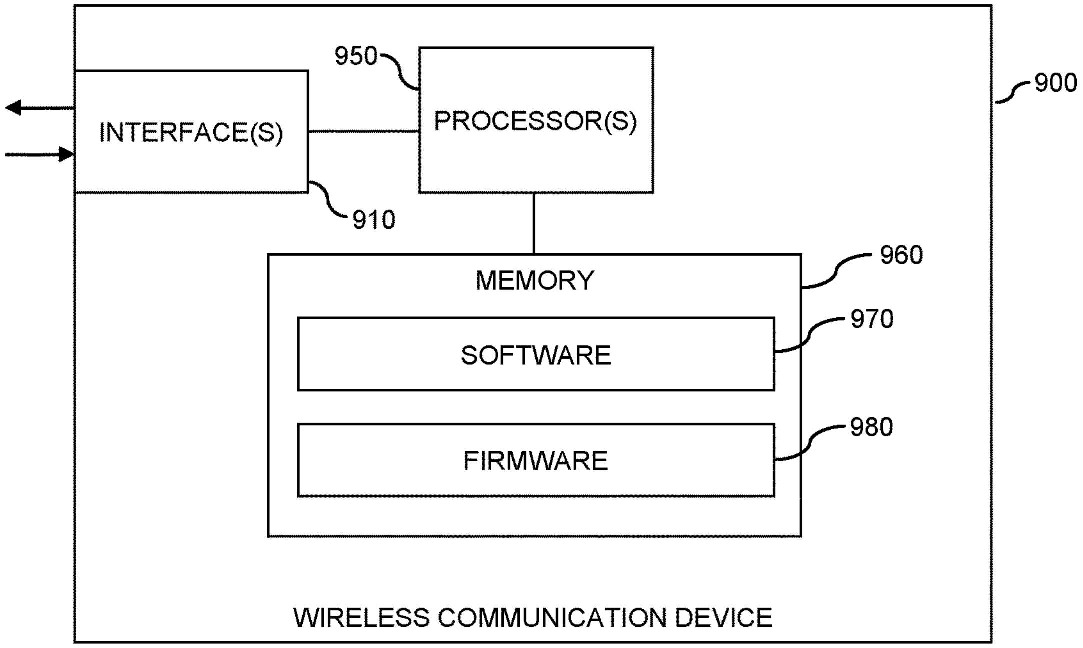
FIG. 9 schematically illustrates structures of a wireless communication device according to an embodiment of the invention.

FIG. 9 illustrates a processor-based implementation of a wireless communication device 900 which may be used for implementing the above-described concepts. For example, the structures as illustrated in FIG. 9 may be used for implementing the concepts in any of the above-mentioned entities 10, 100, 310, or 320.

As illustrated, the wireless communication device 900 includes one or more interfaces 910. These interfaces 910 may include a radio interface for performing the wireless transmissions. Such radio interface may be based on multiple antenna elements each having a tri-polarized configuration, e.g., as explained in connection with FIGS. 3, 4A, 4B, and 4C. Further, such radio interface could be based on the LTE technology, the NR technology, or a 6G technology.

Further, the wireless communication device 900 may include one or more processors 950 coupled to the interface(s) 910 and a memory 960 coupled to the processor(s) 950. By way of example, the interface(s) 910, the processor(s) 950, and the memory 960 could be coupled by one or more internal bus systems of the wireless communication device 900. The memory 960 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 960 may include software 970 and/or firmware 980. The memory 960 may include suitably configured program code to be executed by the processor(s) 950 so as to implement the above-described functionalities of a device for controlling wireless transmissions, such as explained in connection with FIG. 7.

It is to be understood that the structures as illustrated in FIG. 9 are merely schematic and that the wireless communication device 900 may actually include further components which, for the sake of clarity, have not been illustrated, e.g., further interfaces or processors. Also, it is to be understood that the memory 960 may include further program code for implementing known functionalities of a transmitter device or receiver device, e.g., known functionalities of UE or of an access node. According to some embodiments, also a computer program may be provided for implementing functionalities of the wireless communication device 900, e.g., in the form of a physical medium storing the program code and/or other data to be stored in the memory 960 or by making the program code available for download or by streaming.

Figure 10:
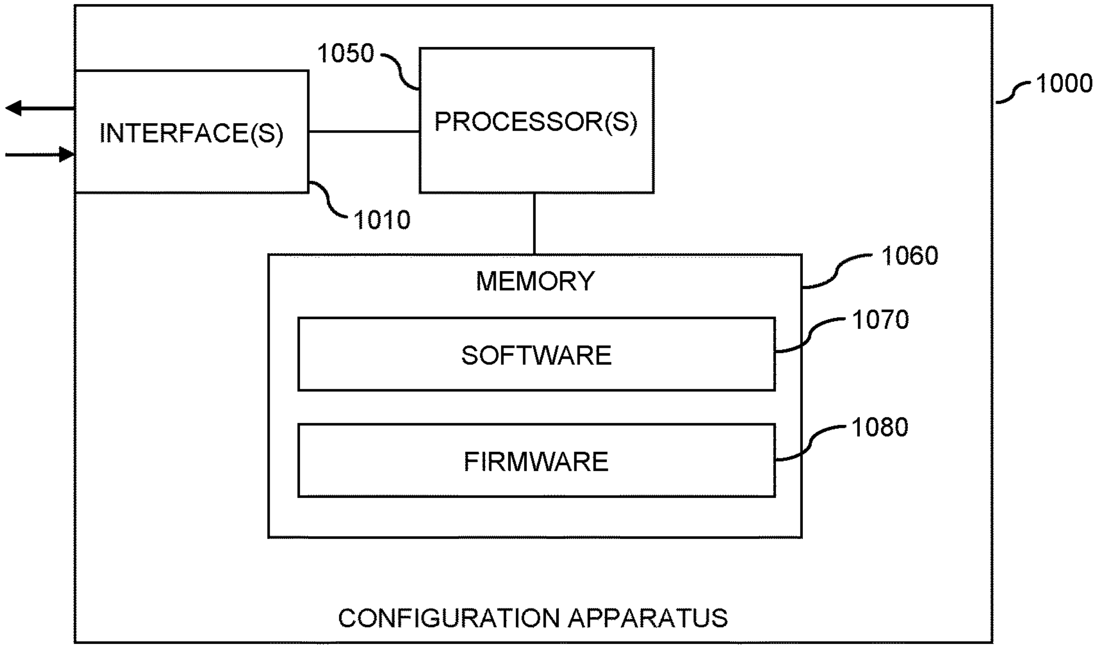
FIG. 10 schematically illustrates structures of a configuration apparatus according to an embodiment of the invention.

FIG. 10 illustrates a processor-based implementation of a configuration apparatus 1000 which may be used for implementing the above-described concepts. For example, the structures as illustrated in FIG. 10 may be used for implementing the concepts in any of the above-mentioned entities 100 or 160, or in equipment for manufacturing wireless communication devices.

As illustrated, the configuration apparatus 1000 includes one or more interfaces 1010. These interfaces 1010 may include a configuration interface with respect to a wireless communication device. In some cases, such configuration interface may also be implemented via a radio interface of the wireless communication device. Such radio interface could be based on the LTE technology, the NR technology, or a 6G technology.

Further, the configuration apparatus 1000 may include one or more processors 1050 coupled to the interface(s) 1010 and a memory 1060 coupled to the processor(s) 1050. By way of example, the interface(s) 1010, the processor(s) 1050, and the memory 1100 could be coupled by one or more internal bus systems of the configuration apparatus 1000. The memory 1060 may include a ROM, e.g., a flash ROM, a RAM, e.g., a DRAM or SRAM, a mass storage, e.g., a hard disk or solid state disk, or the like. As illustrated, the memory 1060 may include software 1070 and/or firmware 1080. The memory 1060 may include suitably configured program code to be executed by the processor(s) 1100 so as to implement the above-described functionalities of a configuration apparatus 1000, such as explained in connection with FIG. 8.

It is to be understood that the structures as illustrated in FIG. 10 are merely schematic and that the configuration apparatus 1000 may actually include further components which, for the sake of clarity, have not been illustrated, e.g., further interfaces or processors. Also, it is to be understood that the memory 1060 may include further program code for implementing known functionalities of an access node, of a management node, or of manufacturer equipment. According to some embodiments, also a computer program may be provided for implementing functionalities of the configuration apparatus 1000, e.g., in the form of a physical medium storing the program code and/or other data to be stored in the memory 1060 or by making the program code available for download or by streaming.

As can be seen, the concepts as described above may be used for achieving reduced sensitivity to orientation misalignment between tri-polarized planar antenna arrays. This may help to provide increased link performance for many relative orientations and positions of planar antenna arrays. The determination of the beamforming matrices as Golay array triads may allow for achieving such effects in a highly efficient manner, without adding excessive complexity to the wireless communication device.

It is to be understood that the examples and embodiments as explained above are merely illustrative and susceptible to various modifications. For example, the illustrated concepts may be applied in connection with various kinds of radio technologies, without limitation to the LTE technology or NR technology. Further, the concepts may be applied with respect to various types of transmitter devices and receiver devices. Further, the concepts may be applied with respect to various numbers of antenna elements in the transmitter device and/or various numbers of antenna elements in the receiver device. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method performed by a wireless communication device for controlling wireless transmissions, the method comprising: performing wireless transmissions via a planar antenna array of the wireless communication device, the planar antenna array comprising multiple antenna elements which are offset from each other in a first spatial direction and a second spatial direction and which each have a first polarization, a second polarization, and a third polarization; and for at least some of the wireless transmissions, performing beamforming processing by:

for the first polarization, assigning a first beamforming matrix to the antenna elements;

for the second polarization, assigning a second beamforming matrix to the antenna elements; and for the third polarization, assigning a third beamforming matrix to the antenna elements, wherein the first beamforming matrix, the second beamforming matrix, and the third beamforming matrix constitute a Golay array triad.

2. The method according to claim 1, wherein the Golay array triad is determined by expanding one or more Golay vector triads.

3. The method according to claim 1, wherein the Golay array triad is determined by expanding one or more further Golay array triads.

4. The method according to claim 1, wherein the first beamforming matrix, the second beamforming matrix, and the third beamforming matrix are pre-configured in the wireless communication device.

5. The method according to claim 1, comprising:

in a first mode of operation, performing one or more of the wireless transmissions based on the beamforming processing with the first beamforming matrix, the second beamforming matrix, and the third beamforming matrix; and in a second mode of operation, performing one or more of the wireless transmissions based on performing the beamforming processing by:

for the first polarization, assigning a first targeted beamforming matrix to the antenna elements;

for the second polarization, assigning a second targeted beamforming matrix to the antenna elements; and for the third polarization, assigning a third targeted beamforming matrix to the antenna elements, wherein the first targeted beamforming matrix, the second targeted beamforming matrix, and the third targeted beamforming matrix are adaptively determined to define one or more beams directed to one or more further wireless communication devices.

6. The method according to claim 1, wherein the first polarization, the second polarization, and the third polarization are orthogonal linear polarizations.

7. The method according to claim 1, wherein each antenna element comprises at least one electric dipole antenna element.

8. The method according to claim 1, wherein each antenna element comprises at least one magnetic loop antenna element.

9. The method according to claim 1, wherein each antenna element comprises a combination of at least one electric dipole element and at least one magnetic loop element.

10. The method according to claim 1, wherein the planar antenna array is a uniform rectangular array antenna.

11. The method according to claim 1, wherein the wireless communication device is a mobile communication device.

12. The method according to claim 1, wherein the beamforming processing is performed on signals to be transmitted from the planar antenna array.

13. The method according to claim 1, wherein the beamforming processing is performed on signals received by the planar antenna array.

14. A wireless communication device, the wireless communication device being configured to:

perform wireless transmissions via a planar antenna array of the wireless communication device, the planar antenna array comprising multiple antenna elements which are offset from each other in a first spatial direction and a second spatial direction and which each have a first polarization, a second polarization, and a third polarization; and for at least some of the wireless transmissions, perform beamforming processing by:

for the first polarization, assigning a first beamforming matrix to the antenna elements;

for the second polarization, assigning a second beamforming matrix to the antenna elements; and for the third polarization, assigning a third beamforming matrix to the antenna elements, wherein the first beamforming matrix, the second beamforming matrix, and the third beamforming matrix constitute a Golay array triad.

15. The wireless communication device according to claim 14, wherein the first beamforming matrix, the second beamforming matrix, and the third beamforming matrix are pre-configured in the wireless communication device.

16. The wireless communication device according to claim 14, comprising:

at least one processor; and a memory containing program code executable by the at least one processor.

17. A computer program product comprising program code stored on a non-transitory computer readable medium, the program code to be executed by at least one processor of a wireless communication device, whereby execution of the program code causes the wireless communication device to perform a method according to claim 1.

* * * * *